Aug. 2, 1966 R. E. BASCOM ET AL 3,263,799
CONVEYOR BELT
Filed Feb. 27, 1964 2 Sheets-Sheet 1
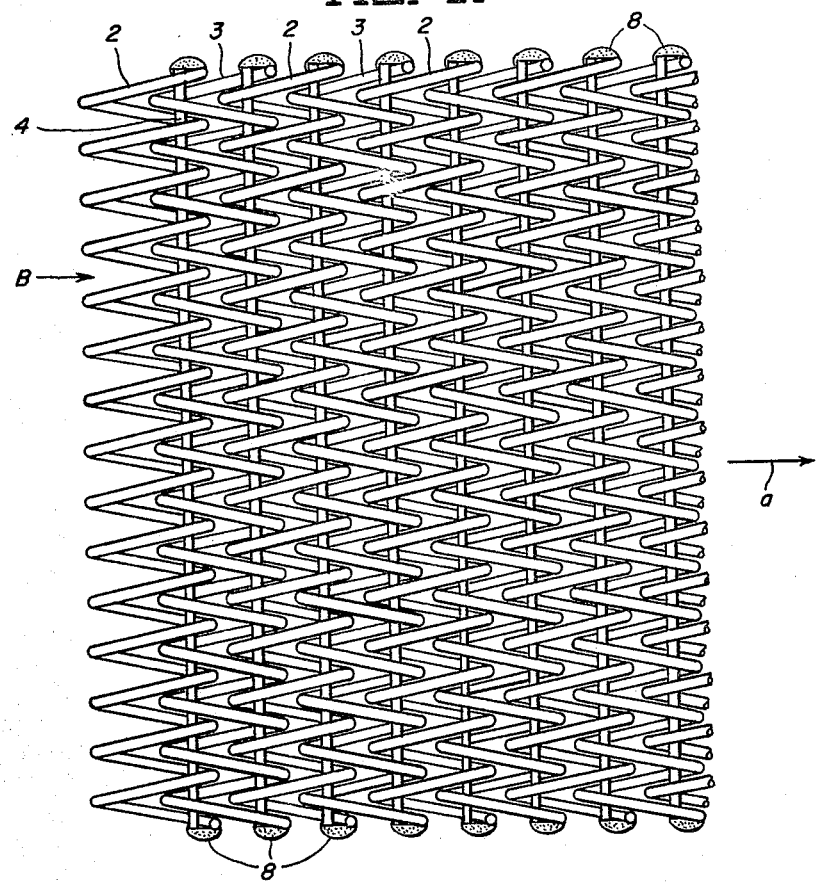
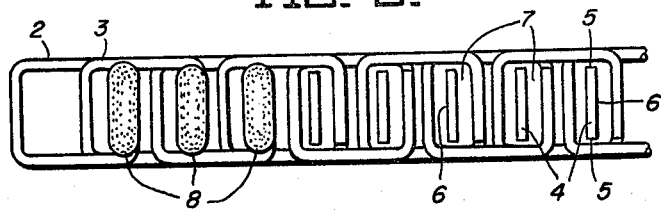
INVENTORS.
RICHARD E. BASCOM and
FREDERICK A. MILLER
By Donald G. Dalton
Attorney

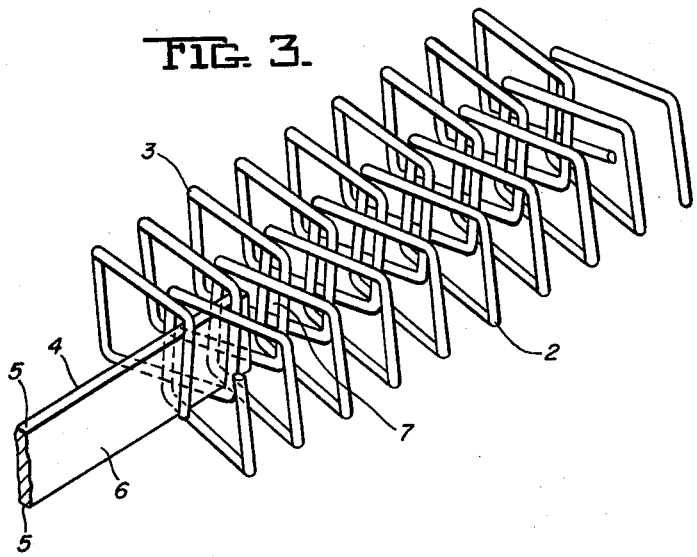
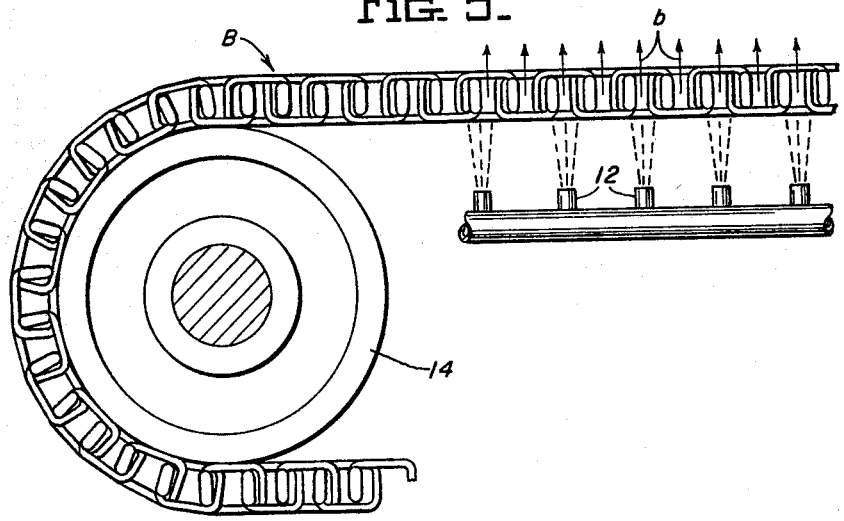
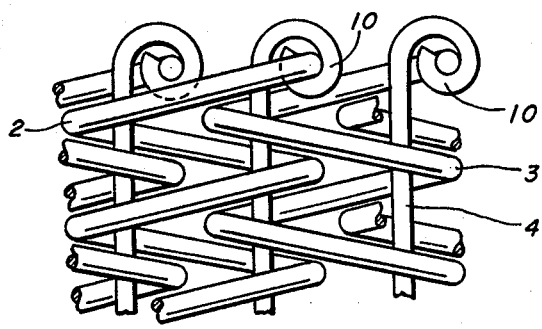
INVENTORS.
RICHARD E. BASCOM and
FREDERICK A. MILLER
By Donald G. Dalton
Attorney 3,263,799
CONVEYOR BELT
Richard E. Bascom, Oakland, and Frederick A. Miller, Concord, Calif., assignors to United States Steel Corporation, a corporation of Delaware
Filed Feb. 27, 1964, Ser. No. 347,849
4 Claims. (Cl. 198—193)

This invention relates to conveyor belts and particularly to balanced weave conveyor belts made from helical wires woven together and used in the processing of food and the like. Belts of this type are difficult to track, partially because they have poor transverse rigidity so that they will sag in the middle, particularly when carrying heavy loads. Placing a longitudinal support in the center only partially solves the problem. It is often desired to direct the flow of fluids upward through this type of belt and most of the belts are so constructed that this flow is not uniform and also tends to dissipate to the surrounding atmosphere instead of following the desired course.

It is therefore an object of our invention to provide a conveyor belt that has increased rigidity across its width, so that it will be able to carry heavier loads without sagging in its center when no support is provided thereunder.

Another object of the invention is to provide such a belt that will track properly on the conveyor rolls without a tendency to shift laterally.

A further object of the invention is to provide a wire coil conveyor belt that has a relatively smooth, flat surface, so as to prevent the marking of articles such as bakery goods or glass products that are being transported by the conveyor in a softened state at elevated temperatures.

The attainments of these and other objects by our invention will appear more readily from the following detailed description of a preferred embodiment thereof, shown in the attached drawings, in which:

FIGURE 1 is a top plan view of a portion of my improved conveyor belt;

FIGURE 2 is a longitudinal edge view of the belt of FIGURE 1;

FIGURE 3 is a perspective view of two coils of the same belt in their partially assembled state;

FIGURE 4 is a partial plan view of our belt showing a modified construction of an edge thereof; and FIGURE 5 is a side view of a portion of the conveyor belt mounted on one of its end rolls.

Referring to FIGURES 1 and 2, conveyor belt B includes a series of wire coils 2 and 3 which are preferably made of round stainless steel wires with the coils having a rectangular section as compared to the round section which is most commonly used. Adjacent coils are interconnected by vertically-standing, flat metal strips 4, also preferably made of strainless steel. Coils 2 form right-hand wound helixes, while coils 3 form left-hand wound helixes. The belt is intended to travel in the direction of arrow $a$ in FIGURE 1, so that the flat strips 4 extend across the width of the belt.

As seen best in the perspective view of FIGURE 3, the flat strips 4 stand on their longitudinal edges 5 with their face surfaces 6 perpendicular to the surface of the belt. These strips so positioned give the belt B improved lateral rigidity and enable it to carry heavier loads than were heretofore possible. Furthermore, if the edges 5 of the strips 4 are made many times smaller than their wide face surfaces 6, as in FIGURES 2 and 3, the increase in the lateral rigidity of the belt may be accomplished without a significant increase in weight, and without impairing the belt's flexibility in its longitudinal direction of travel. Because of their narrow edges 5, the strips 4 act as good hinges and provide for easy turning of the belt around the rolls at the ends of the conveyor. These strips also improve the tracking ability of the belt B, since the belt is kept flat across its width as it comes into contact with the end rolls. Even a slight degree of lateral curvature in the belt when it contacts an end roll will cause it to shift to the right or left.

The coils 2 and 3 are of rectangular section to conform to the shape of the flat bars 4 where they wrap around the bars. This rectangular shape has the additional advantage of providing a conveyor belt with a smooth top surface, on which delicate or heat-softened articles may be carried without breakage or undesirable surface marking. The rectangular shape also increases the strength of the belt and enables easier assembly and splicing of the belt.

The right-hand coils 2 and the left-hand coils 3 are arranged in alternating order to produce a non-directional surface pattern, seen best in FIGURE 1, that will cause the belt B to track over the conveyor end rolls without sliding to the right or left. With this non-directional surface pattern combined with the vertically-standing strips 4 which prevent the belt from sagging in the middle, the belt B has excellent tracking qualities.

The belt B may be easily assembled or spliced, since the coils 2 and 3 are not interlacked, but, as seen in FIGURE 3, each winding of one coil is merely inserted between two windings of an adjacent coil. Two adjacent coils are fastened together by inserting a metal strip 4 through one of the laterally extending rectangular openings 7 that occur where the coils overlap. The strips 4 held in an upright position within the coils by fastening the end of each strip to the end winding of a coil, either by welding, as shown by welds 8 in FIGURES 1 and 2, or by crimping the ends of the strip 4 around the end windings of the coils, as shown by the crimped ends 10 in the partial plan view of the belt in FIGURE 4. Although each strip 4 is fastened to a wire coil, only a few are shown welded in FIGURE 2, so that the ends of the other strips may be seen clearly.

FIGURE 5 shows the belt B in use for processing food. In this embodiment hot or cold air or other fluid from orifices 12 is passed through the belt B which is shown mounted on an end roll 14. Each roll 14 is preferably a self-centering roll of the type shown in U.S. Patent Nos. 2,592,581, 2,593,157, 2,593,158, to E. T. Lorig. Because of the shape of the coils 2 and 3 and the arrangement and shape of the connecting strips 4, longitudinal air flow through the belt is eliminated. The strips 4 act as vanes which keep the air moving straight upward through the belt, as illustrated by the arrows $b$. Thus the maximum amount of cooling or heating is provided by the air, since the majority of it will contact the material being processed.

While we have illustrated and described preferred embodiments of our invention, modifications may of course be made without departing from the spirit of the invention, or the scope of the appended claims.

We claim:

1. A conveyor belt comprising a plurality of connected helical metal wire coils of substantially rectangular section, said coils being disposed with their axes extending across the width of the belt and having their windings overlapping one another, flat metal strips extending across the width of said belt and each strip inserted through two of said coils in the area where said coils overlap, each strip having a width several times its edge thickness and standing on said edge with its wide surface perpendicular to the belt surfaces and its edges in close proximity to the inside of its associated coil, and means securing each strip to only one of the coils through which it passes.

2. A conveyor including the belt of claim 1 with the ends thereof spliced together to form an endless loop, means for supporting said belt so that an upper and a lower run are formed in said loop, and means for directing a fluid upwardly through said upper run.

3. A conveyor belt according to claim 1 in which said coils are alternately right and left hand.

4. A conveyor including the belt of claim 3 with the ends thereof spliced together to form an endless loop, means for supporting said belt so that an upper and a lower run are formed in said loop, and means for directing a fluid upwardly through said upper run.

References Cited by the Examiner

UNITED STATES PATENTS

| 2,255,452 | 9/1941 | Pink | 245—6 |
| 2,740,615 | 4/1956 | Scholl | 198—193 X |

FOREIGN PATENTS

| 316,520 | 2/1918 | Germany. |

EVON C. BLUNK, *Primary Examiner.*

E. A. SROKA, SAMUEL F. COLEMAN, *Examiners.*